US012451630B2

(12) United States Patent
Georg et al.

(10) Patent No.: US 12,451,630 B2
(45) Date of Patent: Oct. 21, 2025

(54) PLUG-IN CONNECTOR ASSEMBLY

(71) Applicant: Rosenberger Hochfrequenztechnik GmbH & Co. KG, Fridolfing (DE)

(72) Inventors: Thomas Georg, Stein an der Traun (DE); Sebastian Mysyk, Burghausen (DE)

(73) Assignee: Rosenberger Hochfrequenztechnik Gmbh & Co. KG, Fridolfing (DE)

( * ) Notice: Subject to any disclaimer, the term of this patent is extended or adjusted under 35 U.S.C. 154(b) by 363 days.

(21) Appl. No.: 18/033,841

(22) PCT Filed: Oct. 28, 2021

(86) PCT No.: PCT/EP2021/080055
§ 371 (c)(1),
(2) Date: Apr. 26, 2023

(87) PCT Pub. No.: WO2022/090428
PCT Pub. Date: May 5, 2022

(65) Prior Publication Data

US 2023/0411878 A1 Dec. 21, 2023

(30) Foreign Application Priority Data

Nov. 2, 2020 (DE) ..................... 10 2020 128 806.9

(51) Int. Cl.
*H01R 13/00* (2006.01)
*H01R 12/70* (2011.01)
(Continued)

(52) U.S. Cl.
CPC ....... *H01R 12/716* (2013.01); *H01R 12/7052* (2013.01); *H01R 12/73* (2013.01)

(58) Field of Classification Search
CPC .. H01R 12/716; H01R 12/7052; H01R 12/73; H01R 24/54; H01R 12/75; H01R 2103/00; H01R 24/50
See application file for complete search history.

(56) References Cited

U.S. PATENT DOCUMENTS 4,598,961 A * 7/1986 Cohen .................... H01R 24/50 439/877
4,889,500 A * 12/1989 Lazar ................ H01R 13/6585 439/364
(Continued)

FOREIGN PATENT DOCUMENTS

CN 107591659 A 1/2018
CN 107658607 A 2/2018
(Continued)

OTHER PUBLICATIONS

Machine Translation of CN107658607.

*Primary Examiner* — Abdullah A Riyami
*Assistant Examiner* — Nelson R. Burgos-Guntin
(74) *Attorney, Agent, or Firm* — David P. Dickerson

(57) ABSTRACT

Plug-in connector (10) having an inner conductor (11), an insulating part (13) and an outer conductor (15), wherein the insulating part (13) is arranged between the inner conductor (11) and the outer conductor (15), wherein the inner conductor (11) and the insulating part (13) are of U-shaped design on account of having a first limb and a second limb as well as a web which connects the limbs, wherein the plug-in connector has a first end (17) and a second end (19) at which the plug-in connector (10) respectively forms a first interface and a second interface on account of the inner conductor (11) and in particular the outer conductor (15) being designed, at the first end (17) and the second end (19), to be connected to conductors (107, 108) of an object (110) for connection.

20 Claims, 2 Drawing Sheets

(51) Int. Cl.
*H01R 12/71* (2011.01)
*H01R 12/73* (2011.01)

(56) References Cited

U.S. PATENT DOCUMENTS

| | | | | | |
|---|---|---|---|---|---|
| 5,190,474 | A * | 3/1993 | Ginet | H01R 24/50 | 439/581 |
| 6,390,825 | B1 * | 5/2002 | Handley | H01R 24/50 | 439/63 |
| 6,524,118 | B1 * | 2/2003 | Kikuchi | H01R 24/542 | 439/79 |
| 7,484,965 | B2 * | 2/2009 | Chien | H01R 24/50 | 439/63 |
| 2003/0073328 | A1 * | 4/2003 | Driscoll | H05K 7/1454 | 439/65 |
| 2003/0077931 | A1 * | 4/2003 | Hida | H01R 24/46 | 439/188 |
| 2003/0203658 | A1 * | 10/2003 | Zhao | H01R 24/50 | 439/63 |
| 2005/0136701 | A1 * | 6/2005 | Ikeda | H01R 24/40 | 439/63 |
| 2012/0122339 | A1 * | 5/2012 | Taguchi | H01R 13/504 | 439/578 |
| 2013/0040505 | A1 * | 2/2013 | Hirakawa | H01R 12/721 | 439/733.1 |
| 2016/0315427 | A1 * | 10/2016 | Kawakami | H01R 13/6594 | |
| 2016/0380374 | A1 | 12/2016 | Singhammer et al. | | |

FOREIGN PATENT DOCUMENTS

| | | | |
|---|---|---|---|
| CN | 108365358 | A | 8/2018 |
| JP | 2005050752 | A | 2/2005 |
| KR | 20160030136 | A | 3/2016 |

* cited by examiner

PLUG-IN CONNECTOR ASSEMBLY

FIELD OF THE INVENTION

The present invention relates to an assembly, in particular to an assembly comprising a plug-in connector.

TECHNICAL BACKGROUND

It is known how to mount electrical conductors on circuit boards by means of plug-in connectors.

SUMMARY OF THE DISCLOSURE

Inter alia, the present disclosure discloses an assembly that better utilizes the available design space in a housing in which a circuit board is mounted.

Inter alia, the present disclosure teaches:

- a plug-in connector having an inner conductor, an insulating part and an outer conductor, wherein the insulating part is situated between the inner conductor and the outer conductor, wherein the inner conductor and the insulating part are U-shaped by comprising a first limb and a second limb as well as a web joining the limbs, wherein the plug-in connector comprises a first end and a second end, at which the plug-in connector forms a respective first interface or a second interface as the inner conductor and the outer conductor being designed to be connected, at the first end and the second end, respectively to conductors of an object to be connected.

Plug-in connectors serve for disconnecting and connecting electric conductors to a mating connector. The connection parts are suitably oriented for this by a form fit of the plug-in parts. Plug-in connectors often have detent and/or locking means for locking or interlocking a plug-in connector to a mating connector. It is conceivable to additionally secure plug-in connectors against unintentional loosening by using screws. The terms plug-in connector and mating connector are interchangeable.

An interface of a plug-in connector, also called the plug face or plug interface, forms one end of the connector at the plug side and is adapted for making contact with a compatible interface.

In some embodiments, the plug-in connector and the mating connector each have at least one pluggable interface.

The pluggable interface of the plug-in connector refers to the mating connector. A further interface of the plug-in connector with the circuit board can be removable or non-removable. Non-removable means that the interface is adapted for only a one-time connection of the interface, i.e., the removal may be complicated, only possible with the aid of a tool, or done in a non-destructive manner, for example.

Accordingly, the interface of the mating connector can also be plugged into the plug-in connector. An interface of the mating connector with a cable can be pluggable or hard wired.

Coaxial cables are bipolar cables with a concentric design. They consist of an inner conductor which is surrounded at a constant spacing by a hollow cylindrical outer conductor. The outer conductor shields the inner conductor against interfering radiation.

The space in between is known as an insulator, insulating part, or dielectric, and it insulates the outer conductor from the inner conductor. The dielectric may comprise air. An insulating part comprises a solid material. Often the outer conductor is protected to the outside by an insulating, corrosion-resistant and watertight casing. The outer conductor often comprises a flexible braid (umbrella braid).

Other cables also exist, such as Twin-Ax or Tri-Ax cables, having multiple inner conductors and an outer conductor.

Accordingly, a plug-in connector, which having a cable comprising an inner conductor, an insulating part and an outer conductor, also has an equal number of inner conductors to the cable, the inner conductors of the cable making contact with the inner conductors of the plug-in connector, an insulator, an insulating part or a dielectric, and especially an outer conductor, making contact with the outer conductor of the cable. The inner conductors of the plug-in connector are also known as the plug contacts.

The outer conductor of a cable need not necessarily correspond to the outer conductor of a plug-in connector, i.e., a cable (plug-in connector) without an outer conductor can be connected to a plug-in connector (cable) having an outer conductor.

In the present disclosure, the term "U-shaped" may be optionally understood as meaning that an object has two parallel limbs, which are joined by a web standing perpendicular to the limbs. The limbs and the web can make a right angle with each other or a contour with a continuous curvature. The limbs and the web can each have different lengths. The limbs may be longer than, of equal length to or shorter than the web. An alternative term for U-shaped is horseshoe-shaped.

Double U-shaped means that an object has three parallel limbs, which are joined by a web standing perpendicular to the limbs, namely, between the first and second limb and between the second and third limb. The numbering of the limbs is interchangeable.

Insofar as the present disclosure refers to terms such as parallel, right-angled, perpendicular, or the like, this shall mean in the following substantially parallel, right-angled, perpendicular, or the like, i.e., that an angle may deviate slightly, e.g., by 1°, 2°, 3°, 4° or 5°, from 0°, 180° or 90°.

A circuit board, also known as a circuit card, board or printed circuit, printed circuit board or PCB, is a carrier for electronic components. A circuit board serves for the mechanical fastening of the components and their electrical connection.

A plate is a sheet-like work product made of metal, the width and length of which are much larger than its thickness. Almost any metal can be worked into a plate.

A housing is a firm shell, protectively surrounding a delicate content, or protecting the surroundings against hazardous contents.

Inter alia, the present disclosure discloses a plug-in connector, contacting a circuit board, formed in a U-shaped or double U-shaped configuration. In this way, the plug-in connector can be fastened in a stable manner on the circuit board and electrically contacted. If one limb of the plug-in connector or the mating connection is led through a opening of a circuit board, the design height of a circuit board assembly can thus be reduced. The design height is oriented perpendicular to the circuit board with the opening.

In some embodiments, a plug-in connector can be designed as a coaxial plug-in connector with one inner conductor or as a plug-in connector having multiple inner conductors.

In some embodiments, the outer conductor is U-shaped and in particular connected to a fastening arm such that the outer conductor and the fastening arm form a double U-shape or the outer conductor is double U-shaped.

Accordingly, the outer conductor assures the functionality of a fastening arm, the outer conductor being connected to a fastening arm. Hence, the stability of the plug-in connector on the circuit board is enhanced, the plug-in connector being for example less vulnerable to vibrations.

In some embodiments, the plug-in connector has fastening means at the second end for fastening on a circuit board.

The fastening means assure a safe and trouble-free electrical contacting of the electrical contacts of the plug-in connector on the circuit board. For example, the fastening means boost the robustness of the electrical connection between the plug-in connector and the circuit board when vibrations occur.

In some embodiments, the plug-in connector has a third end with a fastening means for fastening on a circuit board. For example, a plug-in connector with a double U-shaped contour has three ends. A plug-in connector with three ends can be fastened and/or make electrical contact at three points if the plug-in connector is fastened to and/or contacts the circuit board at each end.

Advisedly, the first end is adapted for connection to at least one plug contact of a mating connector. Accordingly, the electrical path in the plug-in connector runs from the first end, where the mating connector is attached, to the second end, where the plug-in connector makes electrical contact with the circuit board.

In some embodiments, the outer conductor comprises a shield plate, which connects the limbs of the U-shaped or double U-shaped outer conductor, i.e., it forms at least part of the web. Accordingly, the shield plate is part of the outer conductor and connects the limbs of the outer conductor, which can be made from a different material or by a different fabrication process. For example, it is conceivable to produce the limbs of the outer conductor in a die casting process, for example from die-cast zinc.

A shield plate is a material-saving and space-saving component as compared to a die-cast outer conductor, which can easily be connected to the limbs of the outer conductor.

In some embodiments, a circuit board assembly can have a plug-in connector as described above, with a mating connector and a circuit board, the plug-in connector being connected at the second interface to the circuit board and the circuit board having a opening through which the first limb of the plug-in connector or the mating connectors is led.

Thanks to the arrangement of the plug-in connector in the circuit board assembly, the design height required for a circuit board assembly can be reduced. In particular when the circuit board assembly comprises multiple circuit boards, a plug-in connector as described above makes it possible to shorten the distance between the circuit boards.

In some embodiments, the outer conductor can be double U-shaped or if the outer conductor is U-shaped and connected to a fastening arm such that the outer conductor and the fastening arm form a double U-shape, the fastening arm or a third limb of the double U-shaped outer conductor being fastened on the circuit board. In this way, a robust electrical connection can be assured between the circuit board and the plug-in connector.

If the fastening arm is attached in a stable manner to a U-shaped outer conductor, this is one alternative to a double U-shaped outer conductor having three limbs, by means of which material or material expenses can be saved if the fastening arm is made from a different material than the outer conductor.

It is also expedient to arrange the circuit board assembly in a housing, wherein the housing has a cable interface, in particular in order to connect a plug contact of a cable to the first interface of the plug-in connector. Alternatively, the plug-in connector can be hard wired to the cable and be led through a housing opening.

In this way, a component closed off by a housing and having an interface with an electrical cable can be provided.

It can also be provided that the housing as well as the interface meet certain requirements for material tightness or electrical tightness, so that the housing can be installed in another component.

In some embodiments, the interface of the mating connector is bent at a right angle with respect to the inner conductor and the insulating part of the mating connector. Thanks to the angling of the interface, it can be arranged such that the interface is easily accessible for a plugging process with a cable to be connected to the plug-in connector. Alternatively or additionally, the interface can also be arranged by the angling with respect to the inner conductor and the insulating part of the plug-in connector so as to make better use of the design space available.

If the fastening arm is attached in a stable manner to a U-shaped outer conductor, this is one alternative to a double U-shaped outer conductor having three limbs, by means of which material or material expenses can be saved.

The above embodiments and modifications can be combined with each other however desired, if this makes sense. Further possible embodiments, modifications, and implementations of the invention include even not explicitly mentioned combinations of features of the invention described above or in the following with respect to the exemplary embodiments. In particular, the person skilled in the art will also add individual aspects as improvements or supplementations to the particular basic form of the present invention.

CONTENTS OF THE DRAWING

The present invention shall be explained more closely in the following with the aid of the exemplary embodiments indicated in the schematic figures of the drawing, in which.

Figure 1:
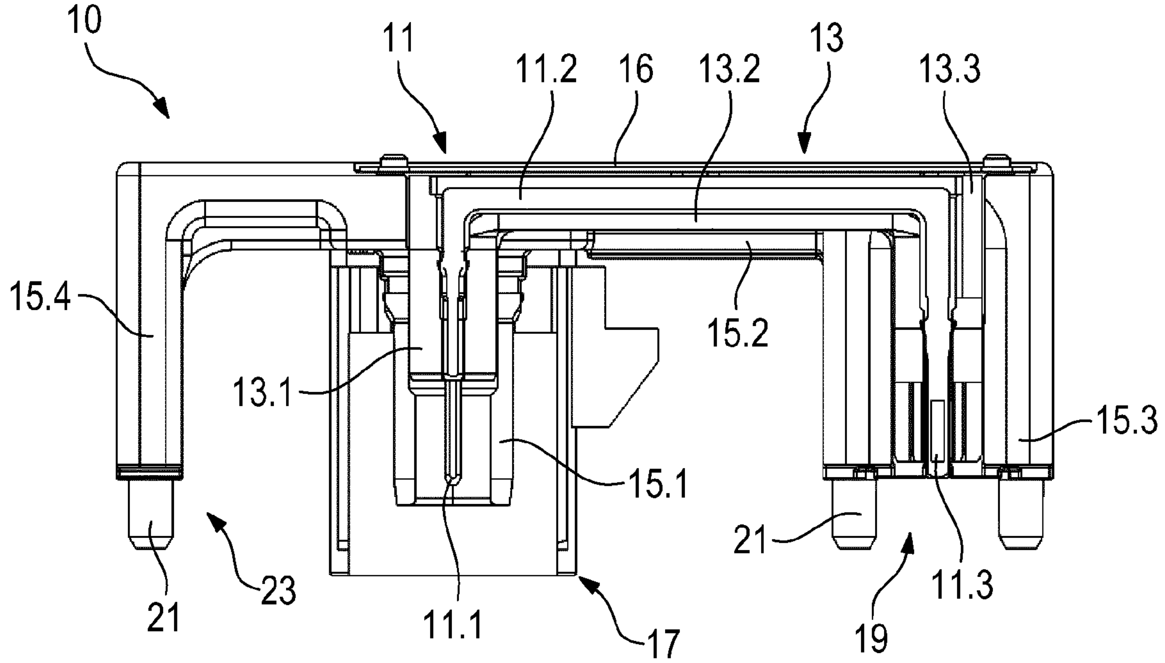
FIG. 1 shows a cross sectional view of a plug-in connector according to one embodiment in accordance with the present disclosure.

The accompanying figures of the drawing should provide a further understanding of the embodiments described in the present disclosure. They illustrate embodiments and serve in conjunction with the description for explaining principles and concepts of the invention. Other embodiments and many of the mentioned advantages will emerge in reference to the drawings. The elements of the drawings are not necessarily shown true to scale with respect to each other.

In the figures of the drawing, the same, functionally identical, and equally acting elements, features and components are provided each time with the same reference numbers, unless otherwise indicated.

In the following, the figures shall be described in a coherent and comprehensive manner.

DESCRIPTION OF EXEMPLARY EMBODIMENTS

FIG. 1 shows a schematic cross sectional view of a plug-in connector 10. The plug-in connector 10 comprises a U-shaped inner conductor 11, a U-shaped insulating part 13, and a double U-shaped outer conductor 15. The inner conductor comprises two parallel limbs 11.1 and 11.3, which are joined by means of a perpendicular web 11.2. The insulating part 13 surrounds the inner conductor, to insulate it electrically from the outer conductor 15, and it is constructed correspondingly to the inner conductor with two parallel limbs 13.1 and 13.3 as well as a perpendicular web 13.2, which joins the limbs of the insulating part. The outer conductor 15 surrounds the insulating part 13 and shields the inner conductor 11 against electromagnetic influences.

The outer conductor is double U-shaped, i.e., the outer conductor comprises three parallel limbs 15.1, 15.3 and 15.4, which are joined by a perpendicular web 15.2. The third limb 15.4 of the outer conductor 15 serves for fastening the outer conductor on a circuit board 103. The first limb 15.1 of the outer conductor is part of an interface with a mating connector 110. The outer conductor 15 comprises fastening pins 21, formed at the ends 17, 19 of the second and third limb of the outer conductor 15. The fastening pins 21 are adapted to be inserted in boreholes of a circuit board, for example soldered, to secure the plug-in connector 10 on the circuit board 103.

The plug-in connector 10 forms at the end 17 of the first limb an interface for connection to a mating connector 110. The plug-in connector 10 forms at the end 19 of the second limb an interface 20 for mechanical fastening and electrical contacting on a circuit board 103.

Figure 2:
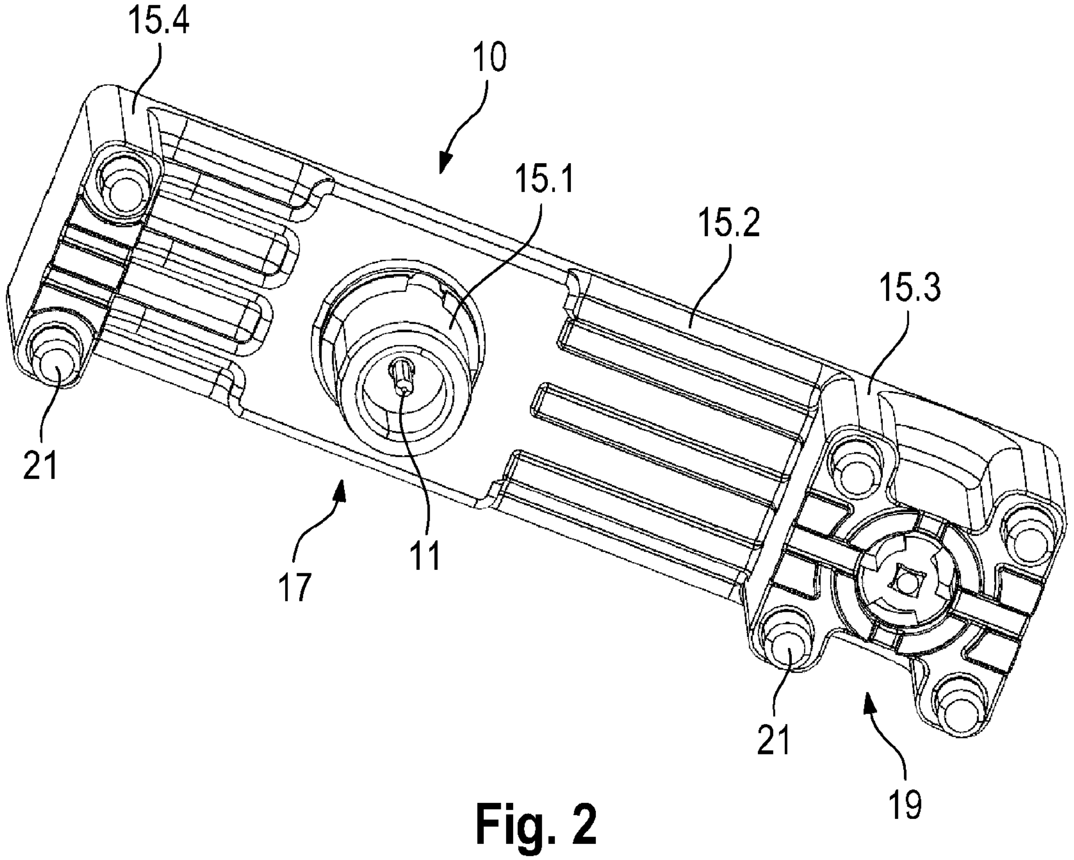
FIG. 2 shows a perspective view of a plug-in connector according to one embodiment in accordance with the present disclosure.

FIG. 2 shows a schematic perspective view of a plug-in connector 10 according to FIG. 1. In FIG. 2 it can be seen that the plug-in connector 10 has two fastening pins 21 at its third end 23 and four fastening pins 21 at its second end 19.

Although the components, especially the inner conductor 11, the insulating part 13 and the outer conductor 15 of the plug-in connector 10, have been described with the aid of multiple partial regions of these components, namely, multiple limbs and a web, it is to be understood that this does not necessarily mean that these components are made of multiple parts, but rather the description of these components with the aid of their partial regions serves first and foremost for describing the geometrical shape of the components. The components, i.e., the inner conductor 11, the insulating part 13 and the outer conductor 15, can be either in a single piece or in multiple pieces, and the division of the components can be done according to the partial regions of the limbs and the web.

Figure 3:
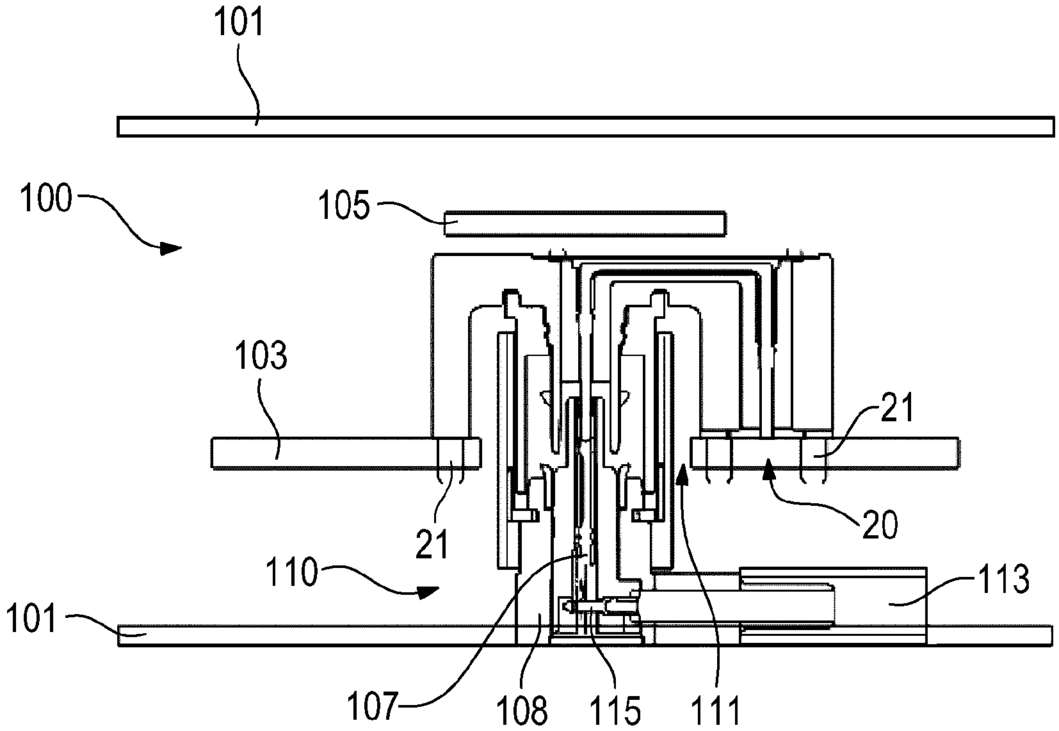
FIG. 3 shows a cross sectional view of a circuit board assembly according to one embodiment in accordance with the present disclosure.

FIG. 3 shows a schematic cross sectional view of a circuit board assembly 100, which is arranged in a housing 101. The circuit board assembly 100 comprises a plug-in connector 10 as was described above, a mating connector 110 as well as a cable 113, a circuit board 103 as well as a circuit board 105.

The plug-in connector 10 is fastened on the circuit board 103 by means of fastening pins 21. The fastening pins are located respectively at the second end 19 and at the third end 23 of the plug-in connector 10. The plug-in connector 10 protrudes at its first end 17, which forms an interface for the mating connector 110, through a opening 111 of the circuit board 103. In this way, the design height of the housing 101, especially the spacing between the housing wall at the cable side and the circuit board 103, can be reduced.

The plug-in connector 10 is connected to the mating connector 110, which is fastened on the housing 101. Thereby, the outer conductor 108 of the mating connector 110 contacts the outer conductor 15 of the plug-in connector 10 and the inner conductor 107 of the mating connector 110 contacts the inner conductor 11 of the plug-in connector 10. Accordingly, the mating connector 110 also comprises at a first end an interface for connection of the mating connector 110 to the plug-in connector 10. Moreover, the mating connector 110 comprises at a second end a further interface for connection to electrical contacts, especially plug contacts 115 of a cable 113. It is provided that the inner conductor 107 or the outer conductor 108 of the mating connector 110 is configured right-angled to the plug contact 115 of the cable 113 when the cable 113 is connected to the further interface of the mating connector 110.

LIST OF REFERENCE NUMERALS

10 Plug-in connector
11 Inner conductor
11.1 Limb of the inner conductor
11.2 Web of the inner conductor
11.3 Limb of the inner conductor
13 Insulating part
13.1 Limb of the insulating part
13.2 Web of the insulating part
13.3 Limb of the insulating part
15 Outer conductor
15.1 Limb of the outer conductor
15.2 Web of the outer conductor
15.3 Limb of the outer conductor
15.4 Limb of the outer conductor
17 End
19 End
20 Interface
21 Fastening means
23 End
100 Circuit board assembly
101 Housing
103 Circuit board
105 Circuit board
107 Inner conductor
108 Outer conductor
110 Mating connector
111 Opening
113 Cable
115 Electrical contact

The invention claimed is:

1. An assembly, comprising:
a connector;
a counterpart connector; and
a circuit board, wherein
said circuit board comprises an opening,
said connector comprises a U-shaped inner conductor,
a first end portion of said U-shaped inner conductor is roughly parallel to a second end portion of said U-shaped inner conductor,
said counterpart connector comprises a second inner conductor that contacts said U-shaped inner conductor, and
at least one of said U-shaped inner conductor and said second inner conductor extends through said opening.

2. The assembly of claim 1, wherein:
said connector comprises a first outer conductor, and
said counterpart connector comprises a second outer conductor that contacts said first outer conductor.

3. The assembly of claim 2, wherein:
said first outer conductor is a U-shaped outer conductor.

4. The assembly of claim 2, wherein:
said first outer conductor is a double-U-shaped outer conductor.

5. The assembly of claim 2, wherein:

a substantial portion of said U-shaped inner conductor is situated in an interior of said first outer conductor.

6. The assembly of claim 1, comprising:

a second circuit board, wherein said counterpart connector is mounted to said second circuit board.

7. The assembly of claim 1, wherein:

said counterpart connector comprises a third end portion and a fourth end portion, said third end portion constitutes a first interface that engages said connector, said fourth end portion constitutes a second interface, and said third end portion is substantially perpendicular to said fourth end portion.

8. The assembly of claim 1, wherein:

said first end portion of said U-shaped inner conductor is connected to a first conductive element of said circuit board, and said second end portion of said U-shaped inner conductor contacts said second inner conductor.

9. The assembly of claim 2, wherein:

said first end portion of said first outer conductor is connected to a second conductive element of said circuit board, and said second end portion of said first outer conductor contacts said second outer conductor.

10. The assembly of claim 1, wherein:

said connector comprises a first shank and a second shank substantially parallel to said first shank, said first shank is mounted to and extends substantially perpendicular from a major surface of said circuit board, and said second shank engages said counterpart connector and is aligned with said opening.

11. The assembly of claim 10, wherein:

said first shank comprises at least one fastener that fastens said connector to said circuit board.

12. The assembly of claim 10, wherein:

said connector comprises a third shank, and said third shank is substantially parallel to said second shank, and said third shank comprises at least one fastener that fastens said connector to said circuit board.

13. The assembly of claim 10, comprising:

a third circuit board, wherein said connector comprises a third shank, said third shank is substantially parallel to said second shank, and said third shank comprises at least one fastener that fastens said connector to said third circuit board.

14. An assembly, comprising:

a connector; and a circuit board, wherein said circuit board comprises an opening, said connector comprises a U-shaped inner conductor, a first end portion of said U-shaped inner conductor is roughly parallel to a second end portion of said U-shaped inner conductor, said first end portion of said U-shaped inner conductor extends substantially perpendicular from a major surface of said circuit board, and said second end portion of said U-shaped inner conductor is aligned with said opening.

15. The assembly of claim 14, wherein:

said second end portion of said U-shaped inner conductor is aligned with said opening such that an axis defined by said second end portion intersects said opening.

16. The assembly of claim 14, wherein:

said second end portion of said U-shaped inner conductor is substantially perpendicular to said major surface of said circuit board.

17. The assembly of claim 14, wherein:

said connector comprises an outer conductor, and a substantial portion of said U-shaped inner conductor is situated in an interior of said outer conductor.

18. The assembly of claim 17, wherein:

said outer conductor is a double-U-shaped outer conductor that defines a first shank, a second shank, and a third shank, said first shank is fastened to said circuit board, said third shank is fastened to said circuit board, and said second shank extends through said opening.

19. The assembly of claim 14, wherein:

said first end portion of said U-shaped inner conductor is within 5° of parallel to said second end portion of said U-shaped inner conductor.

20. The assembly of claim 1, wherein:

said first end portion of said U-shaped inner conductor is within 5° of parallel to said second end portion of said U-shaped inner conductor.

* * * * *